(12) United States Patent
Toomey

(10) Patent No.: US 10,164,956 B2
(45) Date of Patent: *Dec. 25, 2018

(54) METHOD AND SYSTEM FOR TRUST-BASED PROCESSING OF NETWORK REQUESTS

(75) Inventor: Christopher Newell Toomey, Cupertino, CA (US)

(73) Assignee: FACEBOOK, INC., Menlo Park, CA (US)

( * ) Notice: Subject to any disclaimer, the term of this patent is extended or adjusted under 35 U.S.C. 154(b) by 399 days.

This patent is subject to a terminal disclaimer.

(21) Appl. No.: 13/620,272

(22) Filed: Sep. 14, 2012

(65) Prior Publication Data

US 2013/0067555 A1  Mar. 14, 2013

Related U.S. Application Data

(63) Continuation of application No. 12/705,365, filed on Feb. 12, 2010, now Pat. No. 10,021,081, which is a (Continued)

(51) Int. Cl.
*H04L 29/06* (2006.01)
*G06F 21/31* (2013.01)
(Continued)

(52) U.S. Cl.
CPC ............. *H04L 63/08* (2013.01); *G06F 21/31* (2013.01); *G06F 21/33* (2013.01); *H04L 9/002* (2013.01);
(Continued)

(58) Field of Classification Search
CPC combination set(s) only.
See application file for complete search history.

(56) References Cited

U.S. PATENT DOCUMENTS 5,684,951 A  11/1997 Goldman et al.
5,721,780 A  2/1998 Ensor et al.
(Continued)

FOREIGN PATENT DOCUMENTS

WO  WO 02/101516  12/2002
WO  WO 05/050403  6/2005

OTHER PUBLICATIONS

Siebel 7 Integration With Baltimore Select Access 5.0, Technical Integration Brief (Jul. 28, 2002).
(Continued)

*Primary Examiner* — Kaveh Abrishamkar
(74) *Attorney, Agent, or Firm* — Keller Jolley Preece

(57) ABSTRACT

A method and apparatus for fine-grained, trust-based rate limiting of network requests distinguishes trusted network traffic from untrusted network traffic at the granularity of an individual user/machine combination, so that network traffic policing measures are readily implemented against untrusted and potentially hostile traffic without compromising service to trusted users. A server establishes a user/client pair as trusted by issuing a trust token to the client when successfully authenticating to the server for the first time. Subsequently, the client provides the trust token at login. At the server, rate policies apportion bandwidth according to type of traffic: network requests that include a valid trust token are granted highest priority. Rate policies further specify bandwidth restrictions imposed for untrusted network traffic. This scheme enables the server to throttle untrusted password-guessing requests from crackers without penalizing most friendly logins and only slightly penalizing the relatively few untrusted friendly logins.

20 Claims, 11 Drawing Sheets

Related U.S. Application Data continuation of application No. 10/759,596, filed on Jan. 15, 2004, now Pat. No. 7,721,329.

(60) Provisional application No. 60/523,427, filed on Nov. 18, 2003.

(51) Int. Cl.
  *G06F 21/33* (2013.01)
  *H04L 9/00* (2006.01)
  *H04L 9/32* (2006.01)

(52) U.S. Cl.
  CPC .......... *H04L 9/3234* (2013.01); *H04L 9/3297* (2013.01); *H04L 63/123* (2013.01); *H04L 63/126* (2013.01); *H04L 63/1458* (2013.01); *H04L 2209/42* (2013.01); *H04L 2209/76* (2013.01); *H04L 2209/80* (2013.01)

(56) References Cited

U.S. PATENT DOCUMENTS

| | | | |
|---|---|---|---|
| 5,944,794 | A | 8/1999 | Okamoto et al. |
| 5,987,134 | A | 11/1999 | Shin et al. |
| 6,225,995 | B1 | 5/2001 | Jacobs et al. |
| 6,308,273 | B1 | 10/2001 | Goertzel et al. |
| 6,308,274 | B1 | 10/2001 | Swift |
| 6,510,236 | B1 | 1/2003 | Crane et al. |
| 6,510,513 | B1 | 1/2003 | Danieli |
| 6,892,307 | B1 | 5/2005 | Wood et al. |
| 7,353,280 | B2 | 4/2008 | Chiles et al. |
| 7,454,622 | B2* | 11/2008 | Laidlaw .................. H04L 63/08 709/225 |
| 7,454,794 | B1 | 11/2008 | Hibberd |
| 7,461,262 | B1 | 12/2008 | O'Toole |
| 7,584,353 | B2 | 9/2009 | Risan et al. |
| 7,721,329 | B2 | 5/2010 | Toomey |
| 2001/0056493 | A1* | 12/2001 | Mineo ..................... G06Q 30/02 709/227 |
| 2002/0032793 | A1 | 3/2002 | Malan et al. |
| 2002/0042883 | A1 | 4/2002 | Roux et al. |
| 2002/0052921 | A1 | 5/2002 | Morkel |
| 2002/0073339 | A1 | 6/2002 | Card |
| 2002/0083178 | A1 | 6/2002 | Brothers |
| 2003/0028495 | A1 | 2/2003 | Pallante |
| 2003/0046533 | A1 | 3/2003 | Olkin et al. |
| 2003/0076848 | A1* | 4/2003 | Bremler-Barr ...... H04L 12/2602 370/412 |
| 2003/0078035 | A1 | 4/2003 | Sheha et al. |
| 2003/0084165 | A1 | 5/2003 | Kjellberg et al. |
| 2003/0149900 | A1* | 8/2003 | Glassman et al. ............ 713/202 |
| 2003/0177388 | A1 | 9/2003 | Botz et al. |
| 2003/0236841 | A1* | 12/2003 | Epshteyn ....................... 709/206 |
| 2004/0019781 | A1* | 1/2004 | Chari et al. .................... 713/153 |
| 2004/0034797 | A1 | 2/2004 | Becker Hof |
| 2004/0111461 | A1 | 6/2004 | Claudatos et al. |
| 2004/0139352 | A1 | 7/2004 | Shewchuk et al. |
| 2010/0146612 | A1 | 6/2010 | Toomey |

OTHER PUBLICATIONS

Venter, H.S., et al; Vulnerabilities Categories for Intrusion Detection Systems; Computers & Security, vol. 21, No. 7, p. 617-19; Elsevier, 2002; UK.
Pulkkis, G., et al; Network Security Software Skills; Issues and Trends of Information Technology Management in Contemporary Organizations. 2002 Information Resources Management; Association International Conference Part vol. 1 p. 245-8 vol. 1; Idea Group Publishing, Hershey, PA, USA; 2002.
Glover, I.; The Rancour of Infosecurity Recruitment; Secure Computing (International Edition) p. 40-4; West Coast Publishing, Nov. 2000; UK.
Marshall, G.; The Enemy Within [Computer Network Security]; Network Computing vol. 9, No. 5, pp. 24-27; Business and Technical Communications, May 2000; UK.
Middleton, B.; Using the Hacker's Toolbox [Computer Network Security]; Security Management vol. 43, No. 6 p. 59-65; ASIS; Jun. 1999; USA.
Schultz, E.; Advanced Windows NT Security: Password Security; Computer Security Journal vol. 15, No. 2 p. 21-8; Comput. Security Inst; Spring 1999; USA.
Garceau, L.; The Threat of Social Engineering [System Security and Social Interactions]; Ohio CPA Journal vol. 56, No. 1 p. 42-4; Ohio Soc. Certified Public Accountants; Feb. 1997; USA.
Gordon, S.; Social Engineering: Techniques and Prevention; Proceedings of COMPSEC International 1995 p. 445-51; Elsevier, Oxford, UK.
Bishop, M., et al; Improving System Security Via Proactive Password Checking; Computers & Security vol. 14, No. 3 p. 233-49; 1995; UK.
Bhattacharyya, R.K.; New Challenges for Telephone Companies to Secure Switching Systems; Proceedings. 25th Annual 1991 IEEE International Carnahan Conference on Security Technology (Cat. No. 91CH3031-2) p. 41-6; IEEE, New York, NY, USA; Oct. 1, 1991.
Seeley, D.; The Internet Worm, Password Cracking: A Game of Wits; Communications of the ACM vol. 32, No. 6 p. 700-3; Jun. 1989; USA.
Baker, R.; Host Emulation and Other Threats; Computer Fraud & Security Bulletin vol. 11, No. 6, p. 11-13 Apr. 1989, UK.
Nouali-Taboudjemat, N., et al; OPAL: A Single-Use Password Authentication System; Proceedings of the IASTED International Conference. Internet and Multimedia Systems and Applications p. 121-6; IASTED, Anaheim, CA, USA; 2000.
Sung-Ming Yen; Juo-Hong Liao; Shared Authentication Token Secure Against Replay and Weak Key Attacks; Information Processing Letters vol. 62, No. 2, pp. 77-80; Apr. 28, 1997; Netherlands.
Hartson, H.R., et al; A Model of Enforcement Relationships Among Database Access Control Dependencies; Journal of Systems and Software vol. 3, No. 3, p. 201-17; Sep. 1983; USA.
McKenna, T.; Eyes Wide Open: Carriers, Customers Find the Price of Security Is Eternal Vigilance; Telecommunications Americas, 36, 10, 19(5); Sep. 2002.
Products of the Year—Among the Thousands of New Products That Appeared in 2000, The Editors of Network Magazine Recognize 34 That Stand Out From the Rest; (News Briefs); Network Magazine, 42, May 1, 2001.
Taylor, A.; A Question of Security; Telecommunications, 35, 1, 83; Jan. 2001.
Hannan, J.; A Primer on Micro-To-Mainframe Links; Infosystems, V33, N2, p. 32-34; Feb. 1986.
International Search Report as received in PCT/US2004/038751 dated Jul. 12, 2006.
U.S. Appl. No. 10/759,596, Aug. 17, 2006, Office Action.
U.S. Appl. No. 10/759,596, May 31, 2007, Office Action.
U.S. Appl. No. 10/759,596, Mar. 28, 2008, Office Action.
U.S. Appl. No. 10/759,596, Oct. 20, 2008, Office Action.
U.S. Appl. No. 10/759,596, Feb. 17, 2009, Office Action.
U.S. Appl. No. 10/759,596, Sep. 8, 2009, Office Action.
U.S. Appl. No. 10/759,596, Dec. 28, 2009, Notice of Allowance.
U.S. Appl. No. 12/705,365, Jul. 14, 2011, Office Action.
U.S. Appl. No. 12/705,365, Jan. 20, 2012, Office Action.
U.S. Appl. No. 12/705,365, Oct. 3, 2013, Office Action.
U.S. Appl. No. 12/705,365, Apr. 23, 2014, Office Action.
U.S. Appl. No. 12/705,365, Jul. 6, 2016, Office Action.
U.S. Appl. No. 12/705,365, Feb. 16, 2017, Office Action.
U.S. Appl. No. 12/705,365, Mar. 27, 2018, Notice of Allowance.
U.S. Appl. No. 12/705,365, Oct. 5, 2017, Office Action.

* cited by examiner

METHOD AND SYSTEM FOR TRUST-BASED PROCESSING OF NETWORK REQUESTS

CROSS REFERENCE TO RELATED APPLICATION

The present application is a continuation of U.S. application Ser. No. 12/705,365 filed on Feb. 12, 2010, which is continuation of U.S. application Ser. No. 10/759,596 filed on Jan. 15, 2004, which is now issued as U.S. Pat. No. 7,721,329, which claims the benefit of and priority to U.S. provisional application No. 60/523,427 filed on Nov. 18, 2003. Each of the aforementioned patent (s), and application(s) are hereby incorporated by reference in their entirety.

BACKGROUND OF THE INVENTION

Field of the Invention

The invention relates generally to network security. More particularly, the invention relates to a method and system for trust-based, fine-grained rate limiting of network requests.

Description of Related Technology

A fundamental feature of current network technologies is the provision of network services to individual users by furnishing each user an account. Users then request services through their accounts by logging into a server using a client. In current usage, the term 'client' may refer either to the software application by which a user accesses the network resources provided from the server, or the machine that is running the client software. To guarantee that the party attempting to gain access to an account is actually the rightful accountholder, access is controlled through an authentication process, in which the account holder is required to provide one or more pieces of information, known only to the account holder, before he is granted access to network services. Typically, authentication requires provision of a user ID and a password. User accounts are seen in most network environments, e.g. local area networks limited to a small company, as well as in ISP's (Internet service provider) having tens of millions of subscribers. Unfortunately, individuals wishing to make unauthorized use of another's user account are common, and thus password theft has become widespread.

Password theft is a serious problem, frustrating users' expectations of trust, safety, security, and privacy, and interfering with the efforts of ISP's to meet those expectations. While password theft is often involved in particularly serious crimes, such as computer vandalism or identity theft, one of the main motives for password theft is to co-opt user accounts for the sending of 'spam,' i.e. unsolicited e-messages that are sent to many recipients at one time, usually to promote a product or service. Most users find spam annoying and intrusive, but it can also be highly offensive, as when one receives spam that advertises web sites that distribute pornography. Furthermore, large volumes of spam severely burden network infrastructures. Thus, control of password theft constitutes an important measure in reducing the volume of spam. A large ISP may have to reset thousands of accounts per week because of stolen passwords, at a cost of several million dollars per year.

Passwords can be compromised in a number of ways. Users often keep their passwords written on easily found POST-IT NOTES (3M Corporation, St. Paul Minn.) or scraps of paper, instead of committing them to memory; or they may disclose their passwords to friends and co-workers. Often, users are enticed into revealing their user names and passwords via email, instant messaging or by visiting spurious web sites. Additionally, users may be tricked into downloading and installing Trojan horse programs, i.e. keystroke monitoring software that sniffs for typed passwords and subsequently sends them to a hacker. Finally, cracking, guessing a user's password through repeated login attempts, is very common. Generally, cracking is done by means of a software program that iteratively tries one alphanumeric combination after another, until it guesses a user's password.

Crackers generally launch either brute force or dictionary attacks. During a brute force attack, in which the attacker has no previous knowledge of what a password is likely to be, the cracker iteratively tries all possible alphanumeric combinations, starting with one character, and then proceeding to combinations of two characters and so on. A brute force attack typically requires large amounts of computing power. For example, if an attacker were going to attempt cracking all possible six-character passwords composed of the upper-case letters, the lower-case letters and the digits 0-9, there would be about 56,800,000,000 possibilities. Even a powerful computer would require at least several weeks of continuous operation to complete the task. For this reason, brute force attacks are relatively uncommon.

Much more efficient, and more common, are dictionary attacks, in which only words from the dictionary, for example, are tested as passwords. While the total number of words in the English language numbers a few million, there are no more than two hundred thousand words in common use. Thus, a computer capable of trying five thousand passwords per second could try the entire two hundred thousand words in less than a minute. Similarly, the cracker could make guesses based on names, slang, science fiction shows and books, technical jargon and so forth. It is much easier to take a limited set of words and try combinations based on the known set than it is to crack by brute force.

Most efficient is a rule-based attack, in which the attacker has some knowledge of one or more rules used to generated passwords. For example, a password may consist of a word followed by a one or two digit number, e.g. user1, mind67. The cracker then generates passwords according to the rule.

In actuality, most crackers seek to crack the password for a large set of user ID's, for example the passwords of any of the millions of AOL (TIME-WARNER, INCORPORATED) user IDs, rather than try to crack a particular user ID's password. Because many users use one of several simple, common passwords, "abc" or "password," for example, the usual cracking technique is to select such a common password and then iterate through a list of known or generated user IDs, trying each user ID against the common password until a user ID is found that uses the common password. Thus, it is more typical for crackers to guess a user ID matching a chosen password than to guess the password matching a chosen user ID.

For the cracker to target a given service, such as AOL's login servers, the targeted service must offer a higher return, in terms of number of cracked accounts times the value of each cracked account to the cracker, than another service would. This is because a cracker's resources are limited. By reducing the rate at which a cracker is able to crack user accounts, a service can reduce the cracker's return. Any reduction in cracked accounts provides a number of benefits to the service operator, among them reducing the cost of recovering compromised accounts and the cost of handling spam emails sent from them. Additionally, if the service operator can sufficiently reduce the rate at which accounts are cracked, it should be possible to get the cracker to shift his cracking resources to other, easier targets, and thereby achieve a savings in number of cracked accounts far beyond that achievable through rate limiting alone.

The cracker typically needs to guess possible user ID/password pairs at a very high rate to crack enough accounts to support his spamming or other account-abusing activities. On the other hand, server technology has evolved to help meet threats of this type. Servers and routers have the ability to monitor inbound and outbound traffic flows. A server monitors inbound traffic, for example, by tracking the number of packets per second or bytes per second received, perhaps at a selected port, or from a selected network address. As the number of packets or bits per second in a stream increases, the stream consumes more of the server's bandwidth. To apportion bandwidth appropriately, servers and routers have traffic management capabilities, commonly called rate limiting, which include traffic policing measures. Using rate limiting measures, a server manages inbound and outbound traffic according to preconfigured rate policies that enforce bandwidth limits. Rate policies can be configured for various interfaces such as individual ports or trunk groups. Additionally, rate policies can be configured for various types of traffic, for example a specific MAC (media access control) address, or specific TCP (transmission control protocol), or UDP (user datagram protocol) ports.

At its finest granularity, rate limiting is applied to specific source IP (internet protocol) addresses. In this way, a server can detect traffic coming from a particular IP address that exceeds the bandwidth allocated by the rate policy. Thus, servers recognize atypical traffic and apply rate limiting countermeasures immediately. For example, a cracker may mount an attack from behind a particular IP address, perhaps behind a proxy server or a firewall, directing requests to the server at a rate that exceeds the allocated bandwidth. The server then limits the rate at which requests are processed from the particular IP address by limiting the bandwidth to that allocated by the rate policy. Additionally, if the traffic exceeds a certain pre-configured rate, the server may drop the traffic entirely. Thus, by imposing rate limiting countermeasures, a server can fend off, or at least, badly frustrate attacks by crackers.

However, a fundamental limitation of IP-address based rate limiting is that a peer IP address is a very weak proxy for a particular user using a particular PC, and hence IP-address based rate limiting is a very blunt and imprecise tool. A counter measure applied to a suspicious IP address can be a draconian measure. Even though each client machine has it's own local IP address, in many cases the internet traffic from these client machines is routed through an intermediary device, such as a firewall or a web proxy server, and it is the IP address of this intermediary device, rather than that of the individual client machine, that is seen as the requesting IP address by the destination network server. Thus, rate limiting traffic from the IP address of the intermediary device effectively denies or limits service to all users whose requests originate from the suspicious IP address, even though the actual target may be a single cracker among them. Thus, by using the peer (requestor's) IP address alone, the network server has no ability to discern which particular client machine made a given request when it is routed through a shared intermediary device. Further, a given user's peer IP address may change from session to session or even from network request to network request. In this case, applying rate limiting to a peer IP address may have no effect on the targeted user.

It would be a great advance in the art to provide a method of fine-grained rate limiting, in which individual user ID/machine combinations could be distinguished and separately rate-limited even when sharing the same peer IP address.

K. Shin, K. Kobayashi, T. Aratani, Device and method for authenticating access rights to resources, U.S. Pat. No. 5,987,134 (Nov. 16, 1999) provides an approach that requires several different components including challenging data, user identifying information, and an access ticket. Shin, et al. are primarily concerned with authenticating a user, rather than establishing a particular piece of hardware as trusted.

M. Ensor, T. Kowalski, A. Primatic, User-transparent Security method and apparatus for authenticating user terminal access to a network, U.S. Pat. No. 5,721,780 (Feb. 24, 1998) describe a method and apparatus for implementing security in data and telecommunications networks that is independent of and transparent to users. When a user terminal connects to a network control center, the network control center generates an encrypted password based on the user terminal's network coupling identifier. The password is downloaded to the terminal and simultaneously saved by the network control center. Subsequently, when a user attempts to access the network, the network control center retrieves the password from the terminal and compares it with the stored copy. If there is a match, network access is granted. With each logon from the terminal, a new password is generated and downloaded to the user terminal. The exchange of passwords described by Ensor, et al. allows a user terminal to be established as trusted on a session-by-session basis. However, the trust is only machine-specific; it is not specific to the user as well. Furthermore, Ensor, et al. fail to contemplate fine-grained rate limiting based on designating a machine as trusted by issuing a trust token.

K. Seamons, W. Winsborough, Trust negotiation in a client/server data processing network using automatic incremental credential disclosure, U.S. Pat. No. 6,349,338 (Feb. 19, 2002) describe a system in which trust is negotiated between two unfamiliar data processing apparatus by incrementally exchanging credentials. Providing multiple opportunities for exchange of credentials makes it possible to negotiate a higher level of trust between two machines previously unfamiliar with each other than a single exchange of credentials. The approach provided by Seamons, et al. involves the iterative exchange of credentials and credential access policies, wherein the credentials are primarily issued by various third parties and describe the holder of the credential.

Siebel 7 Integration with Baltimore SelectAccess 5.0: Technical information brief describes the use of a trust token to provide SSO (single sign-on) functionality across several applications in different domains. Similarly, R. Zuccherato, Authentication token (Nov. 6, 2002) describes an authentication token that is issued by an authentication server for later use in authenticating to a different application server. There is no teaching in either source of the use of a trust token to designate a particular machine/user combination as trusted, or differentially applying rate limiting countermeasures based on the presence or absence of a trust token.

It would be highly advantageous to be able to distinguish friendly network traffic from hostile network traffic at the granularity of a single user ID/machine combination. It would be further advantageous to reduce the rate at which legitimate users are denied service from a server while thwarting attackers operating from behind the same IP address as legitimate users. It would be a still further advantage to improve server defenses and reduce the volume of spam sent and received by network subscribers by implementing a method of fine-grained, trust-based rate limiting.

SUMMARY OF THE INVENTION

The invention provides a method and apparatus for fine-grained, trust-based rate limiting of network requests. Legitimate network traffic is distinguished from untrusted, and potentially hostile, network traffic at the granularity of an individual user/machine combination. Thus, network traffic policing measures such as rate limiting are readily implemented against the hostile or untrusted traffic without compromising service to trusted user/machines legitimately requesting network services ("friendlies").

In one embodiment of the invention, a client successfully authenticating to a server for the first time is issued a trust token by the server. The trust token is typically a cryptographically secure object, such as a certificate, that is both user and machine-specific. Issuance of the trust token, which is stored by the client, establishes the particular user ID/machine pair as trusted. In subsequent logins, the trust token is provided by the client along with the customary authentication information, such as user ID and password. At the server, a rate limiting component applies traffic policing measures, such as adding response latency, according to rate policies that give highest priority to network requests that are designated trusted, based on the availability of a valid trust token. Thus trusted requests are promptly granted. Rate policies may further specify bandwidth restrictions to be imposed for untrusted network traffic, such as adding a configurable degree of response latency to untrusted traffic. Furthermore, the rate policy can be configured to drop untrusted traffic entirely.

An additional embodiment of the invention is described, wherein trust tokens are stored in a server side database, rather than being stored by the client, allowing the invention to be implemented with clients that lack the capability of storing a trust token. In a further embodiment, a single database provides service to a number of different servers. In a still further embodiment, a single rate limiting component polices traffic for a plurality of servers, while each of the servers manages trust tokens independently of each other.

DETAILED DESCRIPTION OF THE INVENTION

Figure 1:
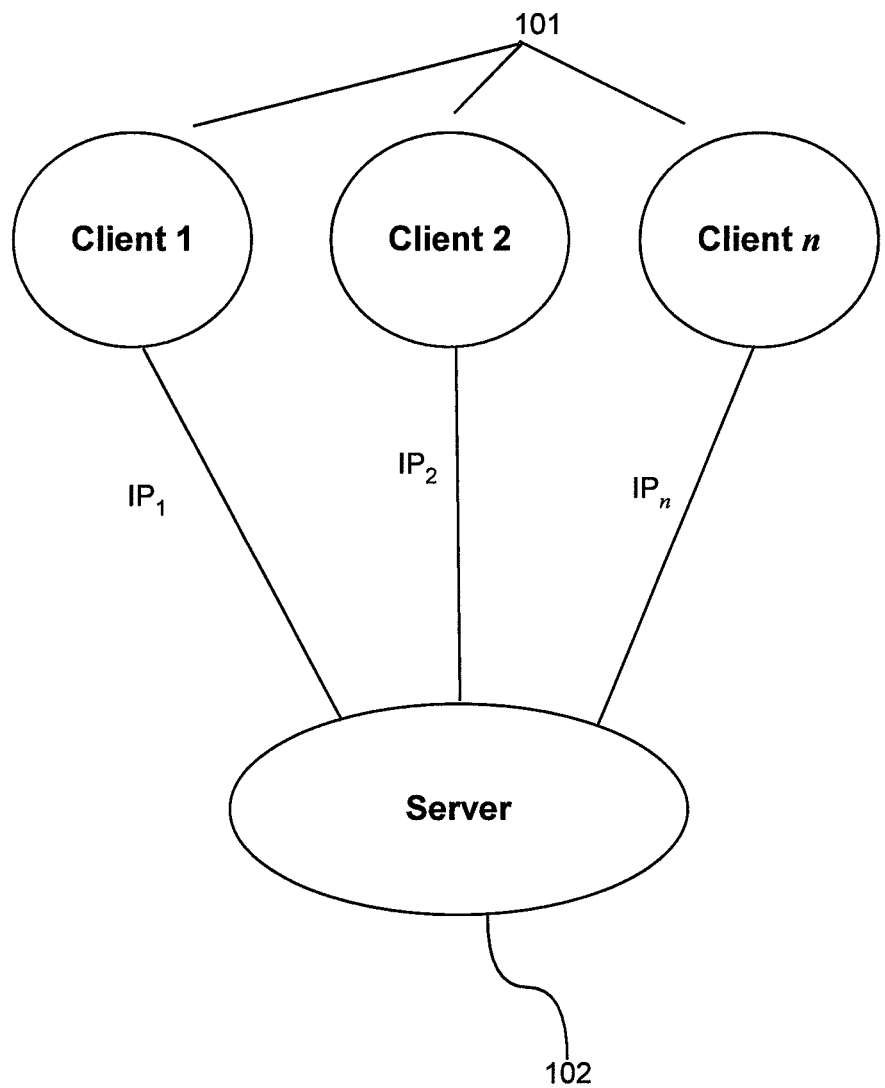
FIG. 1 provides a schematic diagram of a direct network connection between client and server, without interposition of an intermediary.
Figure 2:
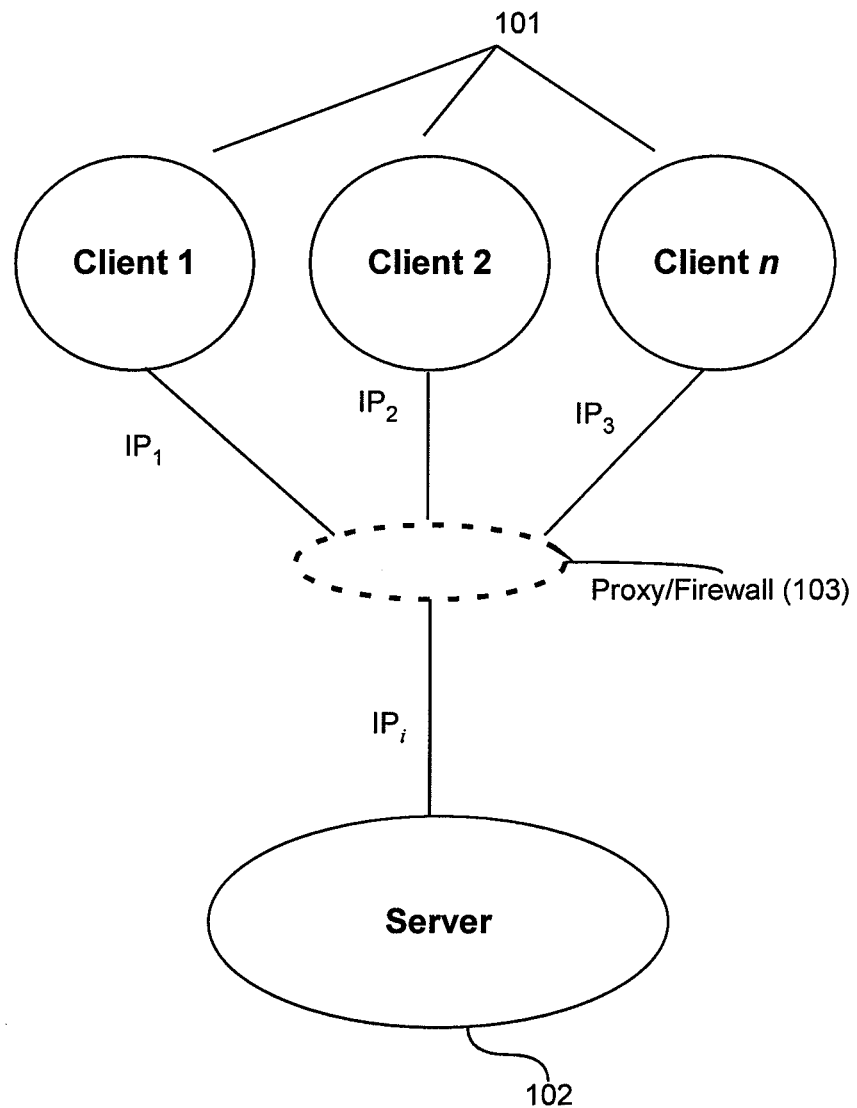
FIG. 2 provides a schematic diagram of a network connection between client and server wherein the client is behind a firewall or proxy server.

As shown in FIGS. 1 and 2, a user of a client machine 101 requests network access or services from a server 102. It will be appreciated that each client 101 has a distinct IP address, denoted by $IP_1$-$IP_n$. When a client directs a request to a server directly, without the interposition of any intermediary devices, as in FIG. 1, the server 102 is readily able to discern the source IP address. Often, however, the client 101 sends its request to the server 102 from behind a proxy server or firewall 103, wherein the proxy/firewall 103 has a distinct IP address, for example "1.160.10.240." There may be many users and many machines behind the proxy/firewall 103, all directing requests to the server 102. The fact that all of this traffic originates from behind the proxy firewall 103 has the effect that all of the traffic, even though it originates from many different users and many different machines, is seen by the server 102 to originate from the same source IP address, that of the proxy/firewall 103, i.e. 1.169.10.240. The server cannot distinguish traffic originating from one machine behind the proxy/firewall 103 from traffic originating from another machine; it all looks the same to the server.

One assumes that the majority of users behind the proxy/firewall 103 are "friendlies," users having legitimate user accounts on the server 102 and having benign intentions. It is also possible, however, that hostile traffic can originate from behind the proxy/firewall 103, for example an attacker trying to crack passwords to user accounts on the server 102. As previously described, an attack by a cracker can consume enough of the server's bandwidth so that the attack is readily detected, and the server can implement countermeasures to defend against the attack, such as rate limiting.

Rate limiting is a traffic management tool that allows a server or router to control the amount of bandwidth specific traffic uses on specific interfaces. While the specific implementation of rate limiting varies according to the manufacturer of the server or router, some general principles of rate limiting are described herein below.

Many network devices implement rate limiting using a token bucket model, in which arriving packets are admitted to a port by removing admission tokens from a bucket. It will be appreciated that larger packets or a greater number of packets per second require more tokens. Tokens are added to the bucket at a rate set by the configured rate limit. As long as the bucket is full, no additional tokens can be added. Traffic arriving at the port can only be accepted if there are sufficient tokens in the bucket. Thus, a rapid burst of traffic causes rapid depletion of the bucket. If the bucket is emptied, traffic cannot be granted ingress to the server. In some cases, incoming traffic is simply dropped until the bucket is replenished. In other cases, incoming traffic is queued until the bucket contains sufficient tokens to admit a portion of the queued traffic. It will be appreciated that queuing incoming traffic and replenishing the bucket with tokens at a configured rate has the effect of imposing latency on the rate at which the incoming traffic is processed. Thus, the latency is configurable by configuring the rate at which the bucket is replenished.

The above scheme for implementing rate limiting is provided for the sake of description only. Other methods of rate limiting are commonly known by those having an ordinary level of skill in the art and are consistent with the spirit and scope of the invention.

Network devices such as servers generally have capabilities for both fixed and adaptive rate limiting. Fixed rate limiting enforces a strict bandwidth limit. The device forwards traffic that remains within the limit, but either queues or drops all traffic that exceeds the limit. Adaptive rate limiting enforces a flexible bandwidth limit that allows for bursts above the limit.

Fixed Rate Limiting

Fixed rate limiting allows one to specify the maximum number of bytes a given port on a network device, such as a server, can send or receive. The port drops or queues bytes that exceed the amount specified. Additionally, rate limiting can be configured for both inbound and outbound traffic. A rate limit is usually expressed in bits per second. The fixed rate limiting policy generally applies to one-second intervals and allows the port to send or receive the number of bytes specified by the rate policy.

Fixed rate limiting counts the number of bytes that a port either sends or receives within the configured time interval. If the number of bytes exceeds the maximum number specified, the port drops all further packets for the rate-limited direction for the duration of the specified interval. At the end of the interval, the port clears the counter and re-enables traffic.

Generally, rate policies are configured on a port-by-port basis. Each port is configured by means of an editable configuration file. Rate policies are typically configured by entering scripted commands in the port's configuration file that specify the direction of traffic flow and the maximum number of bits per second.

Adaptive Rate Limiting

Adaptive rate limiting rate allows configuration of the amount of traffic of a given type a specific port can send or receive. It also allows changing the IP precedence of traffic before forwarding it. Rate policies can be configured for specific types of traffic, for example: layer 3 IP traffic, specific source or destination IP addresses or networks, specific source or destination TDP or UDP ports, specific MAC (media access control) addresses, specific IP precedence values, or Diffsery (differentiated service) control points.

Configuration of adaptive rate limiting policies is similar to that for fixed rate limiting, except that rate policies are specified for each type of traffic. In the event that a rate policy is not specified for a particular traffic type, that type of traffic is sent and received without rate limiting.

Rate limiting should ideally be applied at as fine a granularity as possible, so that those actually doing the cracking are strongly limited without limiting, i.e. inflicting "collateral damage" upon, friendlies in the virtual neighborhood. Unfortunately, this is the biggest limitation of IP address-based rate limiting schemes, because IP addresses are not fine-grained when it comes to network login requests, as previously described.

In practice, this means that it is necessary to identify proxy/firewall IP addresses. This is accomplished by monitoring logs and user feedback for selected network services, and attempting to tune their rate limits such that they are loose enough to account for an average number of users behind such a proxy IP address, yet tight enough to still have some effect on crackers from behind those IP addresses. This is a challenging, ongoing, error-prone exercise that results in too many friendlies being denied service and too many crackers not being adequately rate limited. This scheme also provides an opportunity for malicious hackers to effect a denial of service (DOS) attack on users behind the same proxy IP address.

Differentiating Bad From Good Traffic

IP-address-based rate limiting entails identifying the "bad" IP addresses and then enacting rate limiting countermeasures upon them. Crackers know about this and thus use various means, for example, rotating among proxies or using many different IP addresses, to avoid sending network requests from "bad" IP addresses. Fundamentally, identifying and tagging the "bad" is much more challenging than identifying and tagging the "good," because the bad can and do apply their resourcefulness to escape the tagging. Conversely, in an alternative approach where only the "known good" users are tagged in a cryptographically secure way and are rewarded for being good, there is nothing that the bad users can do, because there is no bad tag to avoid.

Transitoriness

IP addresses typically cannot adequately represent the entities to which it would be ideal to apply trust-based rate limiting to: specific users on specific computers. Many users are assigned different IP addresses each time they start new sessions, for example dialup users; or each time they restart their computers, for example consumer broadband users. Other users randomly come from 1 of n IP addresses corresponding to the machines in the proxy or firewall farm through which their requests originate. Thus, IP address-based countermeasures are only good for as long as the IP/user binding persists. After that, an attacker gets a fresh start and suffers no penalty for past transgressions.

A New Approach

The invention recognizes the following:

Cracker login attempts are distinguishable from typical friendly login attempts:
  All cracker login attempts originate from a computer from which a to-be-cracked user ID has not previously logged in successfully;
  Conversely, most friendly login attempts come from a computer from which the user ID has previously logged in successfully.

Incremental login response latency is very harmful to crackers, but minimally harmful to friendlies:
  Crackers' success rates are directly proportional to number of guesses they can make in a given unit of time;
  Crackers need to make a lot of rapid guesses in order to cost-effectively crack accounts;
  Slowing down cracker guessing proportionally reduces their success rate; and
  At some point, it is more cost-effective for crackers to move to easier targets.

Figure 3:
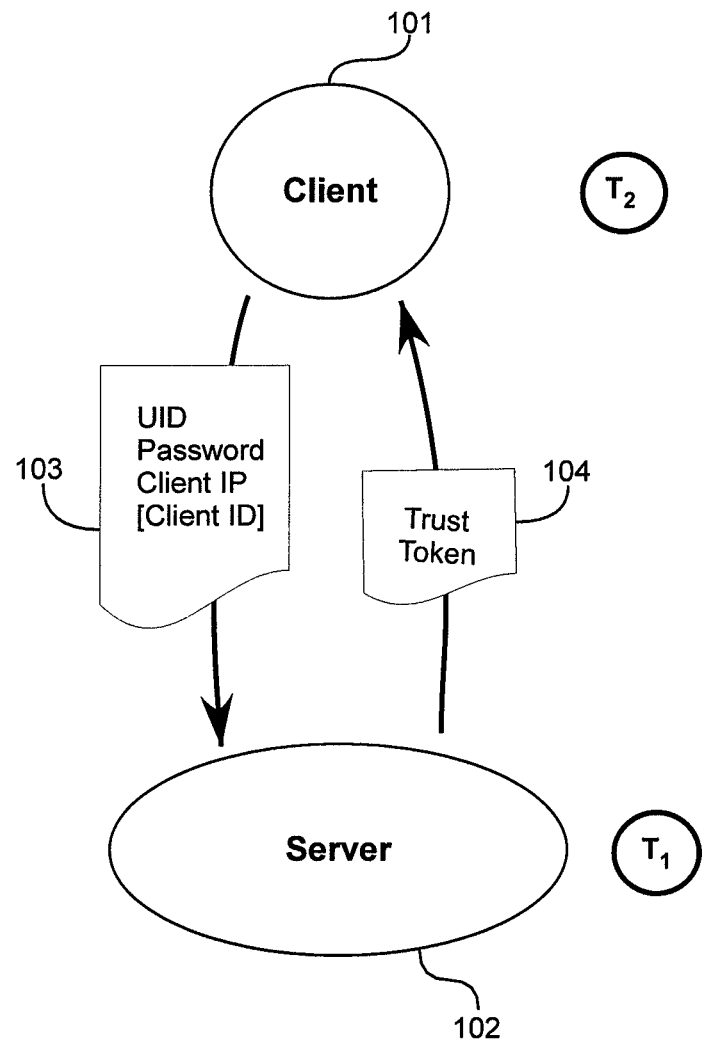
FIG. 3 provides a schematic diagram of a process of establishing a client as trusted in a system for trust-based fine-grained rate limiting of network requests according to the invention.

As shown in FIG. 3, the inventive approach is to tag each user ID/computer pair that successfully logs in, such that future login attempts by that user ID on that computer are treated as trusted and thus incur no additional login response latency, and to add a configurable amount of incremental latency to all untrusted, i.e. untagged, login attempts. In other words, cracker logins are slowed down without affecting most friendly logins from trusted computers, and only slightly penalizing the relatively few untrusted friendly logins.

Preferably, incremental latency is added to both successful and unsuccessful login attempts from untrusted clients. If it is only added to unsuccessful ones, the crackers quickly realize that if a response is not received within a successful response time, the response can be assumed to be unsuccessful. Thus, the cracker need not continue waiting the extra time for the actual response. In one embodiment of the invention, latency is added only to a configurable percentage of successful logins. Thus, attempting not to miss an opportunity for a correct guess, a cracker is forced to wait for responses for wrong guesses, while latency is attached only to some percentage of friendlies that login successfully. In an alternate embodiment, latency is added only to requests from IP addresses that have exceed a configurable, "add-latency" login rate, as described below.

Referring now to FIG. 3, a process is shown for:
identifying entities legitimately entitled to service; and
establishing those identified entities as trusted.

By way of a client 101, a sever requests access or services from a network device, such as a server 102. The request takes the form of a login request 103. In an exemplary embodiment, the login request includes a user ID, a password, and a client ID. A client may include a desktop or notebook computer, a handheld device such as a palmtop computer or a personal organizer, or a wireless telephone. For purposes of the invention, a client is taken to mean any device or software application through which a user requests services from the network device 102. A network device, in addition to being a server, could also include a router or a switch. The client ID constitutes one or more items of data that can be used to uniquely or semi-uniquely identify the client. Thus, a user ID/client pair represents a unique or nearly unique entity. The request is received at the network device 1-2 at time $T_1$. Successfully logging in to the network device 102 identifies the particular user ID/client pair as being entitled legitimate access to the network device 102. Instead of the client providing a password as part of the login credentials, a derivative of the password may be supplied, such as a cryptographic hash of the password.

Following the successful login, the network device issues a user-specific, machine-specific trust token 104. At time $T_2$, the trust token 104 is stored on the client, thus establishing the particular user ID/client pair as trusted.

Figure 4:
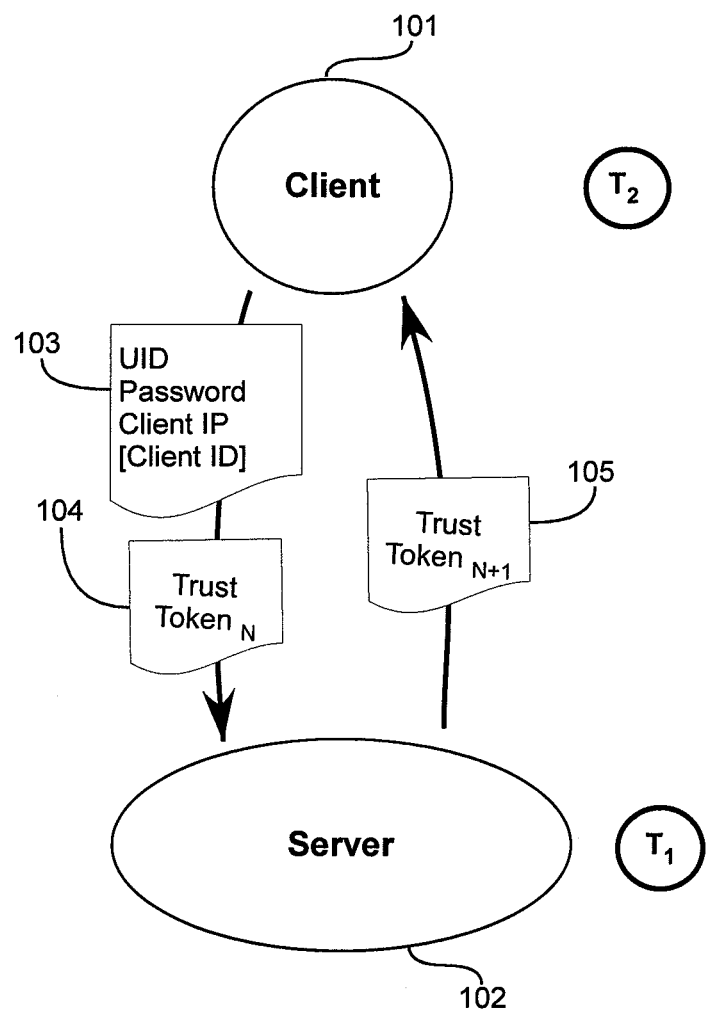
FIG. 4 provides a schematic diagram of a process of updating a trust token in the system of FIG. 2 according to the invention.

Referring now to FIG. 4, a schematic of a trusted login is shown. As in FIG. 3, the user requests service from the network device 102. The login request 103, however, is accompanied by the previously stored trust token 104. By evaluating the trust token 104, the network device is signaled that the login request originates from a trusted entity, a user ID/client pair legitimately entitled to service from the network device 102. Following successful login, an updated trust token 105 is transmitted to and stored on the client 101.

Figure 5:
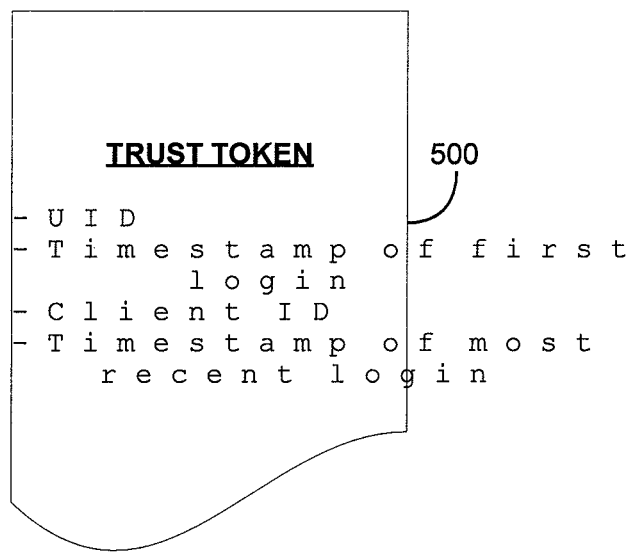
FIG. 5 shows provides a diagram of an exemplary trust token from the system of FIG. 2 according to the invention.

Referring now to FIG. 5, an exemplary embodiment of a trust token 500 is shown. The exemplary trust token constitutes an object, such as a certificate or a statement. As shown, the data included in the trust token includes:
user ID;
timestamp of first login;
client ID; and
timestamp of most recent login.

The foregoing description of the trust token is intended only to be descriptive. Other types of data could be included in the trust token and are well within the spirit and scope of the invention.

Figure 6:
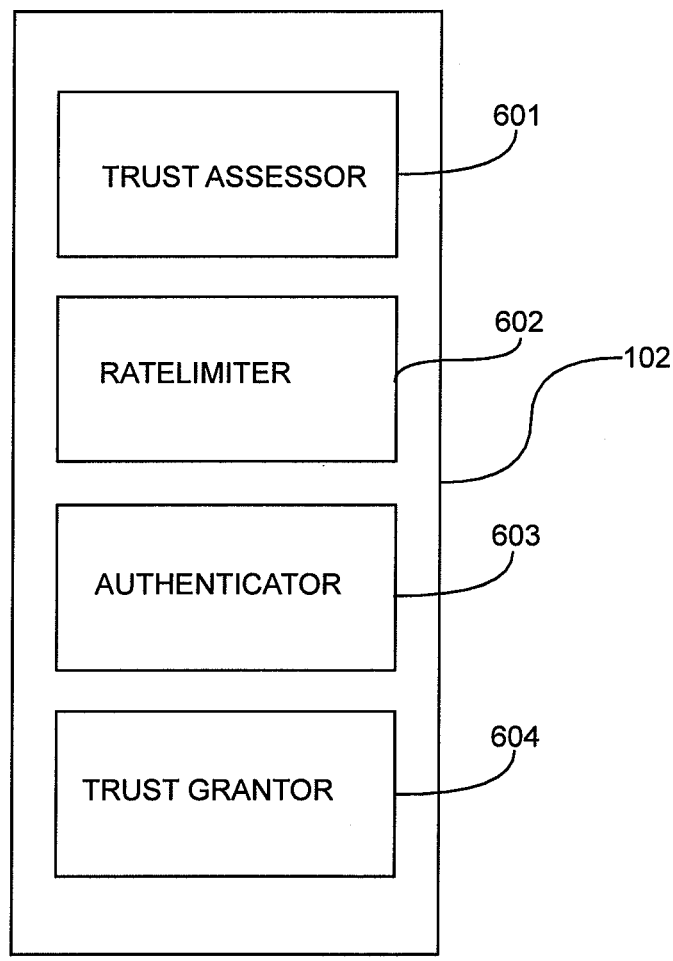
FIG. 6 provides a block diagram of a server architecture from the system of FIG. 3 according to the invention.

FIG. 6 provides a block diagram of an exemplary functional architecture for a network device 102. In an exemplary embodiment, the network device includes:
a trust assessor 601;
a rate limiter 602;
an authenticator 603; and
a trust grantor 604.

Figure 7:
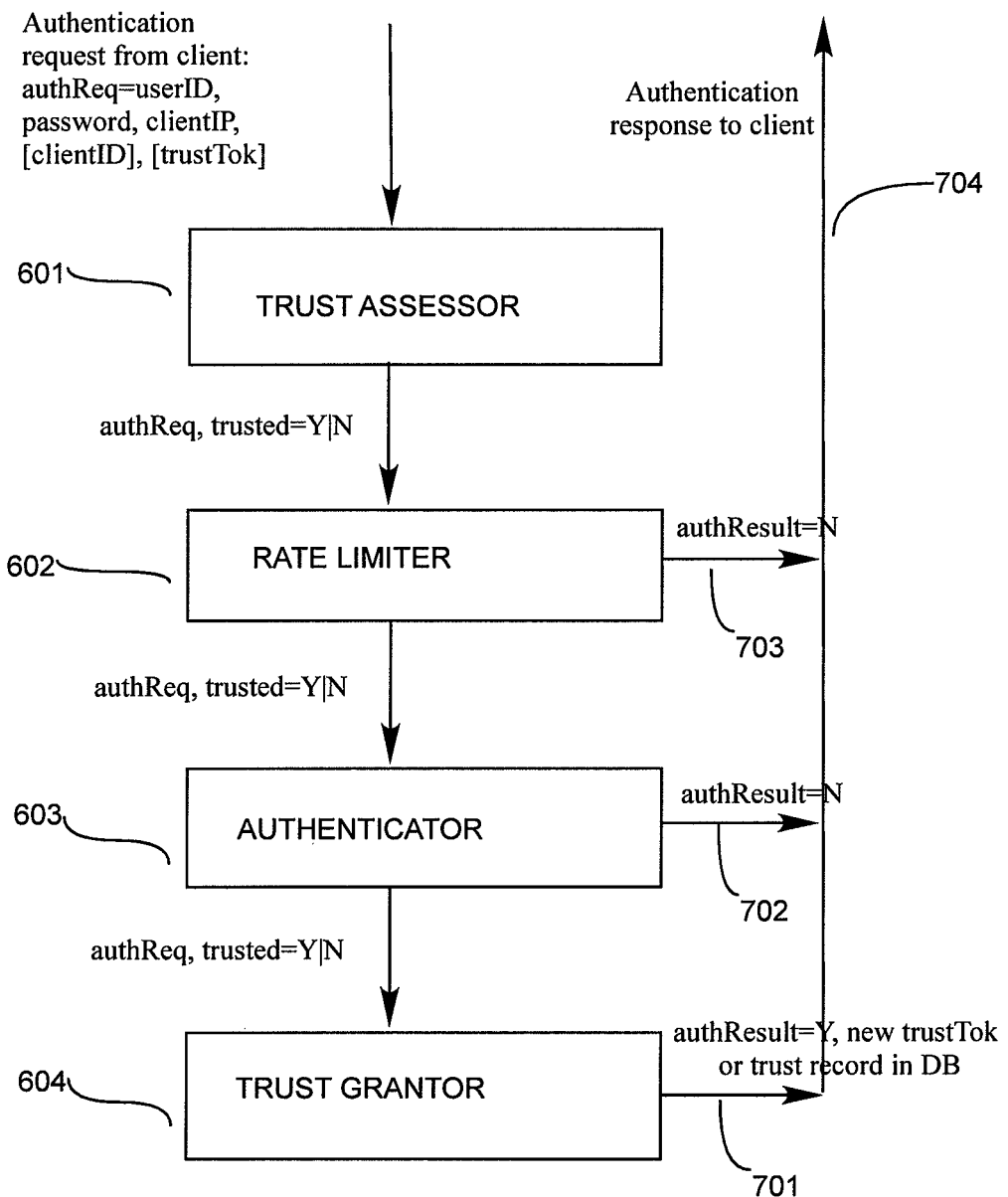
FIG. 7 provides a flow diagram of an authentication process according to the invention.

FIG. 7 illustrates a typical request processing flow as performed by these components, but it should be appreciated that many alternative processing flows are possible and are consistent with the spirit and scope of the invention. For example, FIG. 7 shows a process flow involving a client that is capable of storing and transmitting a trust token. An embodiment of the invention is described further below wherein the trust token is stored in a server-side database, indexed according to client ID and user ID. In such case, the trust assessor 601 retrieves the corresponding trust token from the database, based on the user ID and client ID stored in the database. The token grantor 604 stores an issued token in the database, indexing it according to client ID and user ID.

The trust assessor 601 attempts to obtain the requesting entity's trust token, if any, from either the request-or from the server's database (if stored server-side). If it finds a trust token, it proceeds to validate the token's cryptographic integrity and authenticity; for example, by attempting to decrypt it with the secret key with which it was encrypted. If cryptographic validation succeeds, the trust assessor 604 then proceeds to perform other validation checks defined by the server, such as checking that the client ID contained in the token matches that provided on the request, and checking that the token's first-used and last-used timestamps are no earlier than the server's configured minimum timestamps.

The rate limiter 602 prioritizes authentication requests to be processed by the authenticator 603, based on the client ID, the presence and assessed validity of the associated trust token, and any defined rate limiting policies, to determine if and how to rate-limit the requests. A request accompanied by a valid token is passed immediately to the authenticator 603, with little or no rate limiting being imposed. A request lacking a valid token is given a lower priority. As denoted by the arrow 703, the rate limiter may completely reject a request, as determined by the rate policies configured for the server.

The authenticator 603 is responsible for verifying authenticity of the login credentials, typically user ID and password, presented by the client. The authentication element 503 consults either an internal or external data store containing the authorized user ID and password and determines whether the credentials supplied match those stored in the data store. If the login credentials are invalid, the request is rejected, as denoted by the arrow 702

The trust grantor 604 generates a fresh trust token for the authenticated entity. The trust grantor 604 initially collects the contents of the token supplied by the authenticated entity during authentication, including any of user ID, client ID, first-used timestamp from the old trust token and the current time, i.e. the last-used time to put into the token, and then optionally encrypts the contents using a cryptographically secure encryption algorithm and encryption key. Preferably, the generated trust token includes both the above mentioned encrypted data as well as unencrypted plain-text that denotes at least the identifier of the encryption key used. Additionally, the token issuer generates trust tokens for successful, but previously untrusted logins. In either case, the generated trust token is either transmitted to the client, as denoted by the arrows 701 and 704, or stored in the server-side database, indexed as previously described.

While FIG. 6 depicts the server-side as including a single unit having a number of functional components, in actuality the server, or network device could also include a number of different units, in which the various server side functions are distributed across units. Examples of distributed server-side architecture are described further below.

There follow herein below descriptions of a number of embodiments of the invention involving different server architectures and different client types.

Token-Capable Client

A token-capable client, as shown in FIGS. 3 and 4, is any client capable of storing and transmitting a cryptographically secure trust token, such as a web browser. In a preferred embodiment of the invention, after a client logs into the login server successfully, the login server generates a cryptographically secure trust token, for example triple DES encrypted (data encryption standard). The trust token, shown in FIG. 5, typically contains at least the user ID and the timestamps of first and last logins by the user ID on the client. Additionally the token contains some type of unique, non-spoofable client ID, such as the MAC (media access control) address or the disk drive serial number, such that replay of the token from a machine other than the client the token was issued to is discernable to the server. However, as long as the tokens are sufficiently difficult to capture, as is the case when the transmission occurs over an encrypted communication channel, it is not absolutely necessary that the data be non-spoofable.

Figure 8:
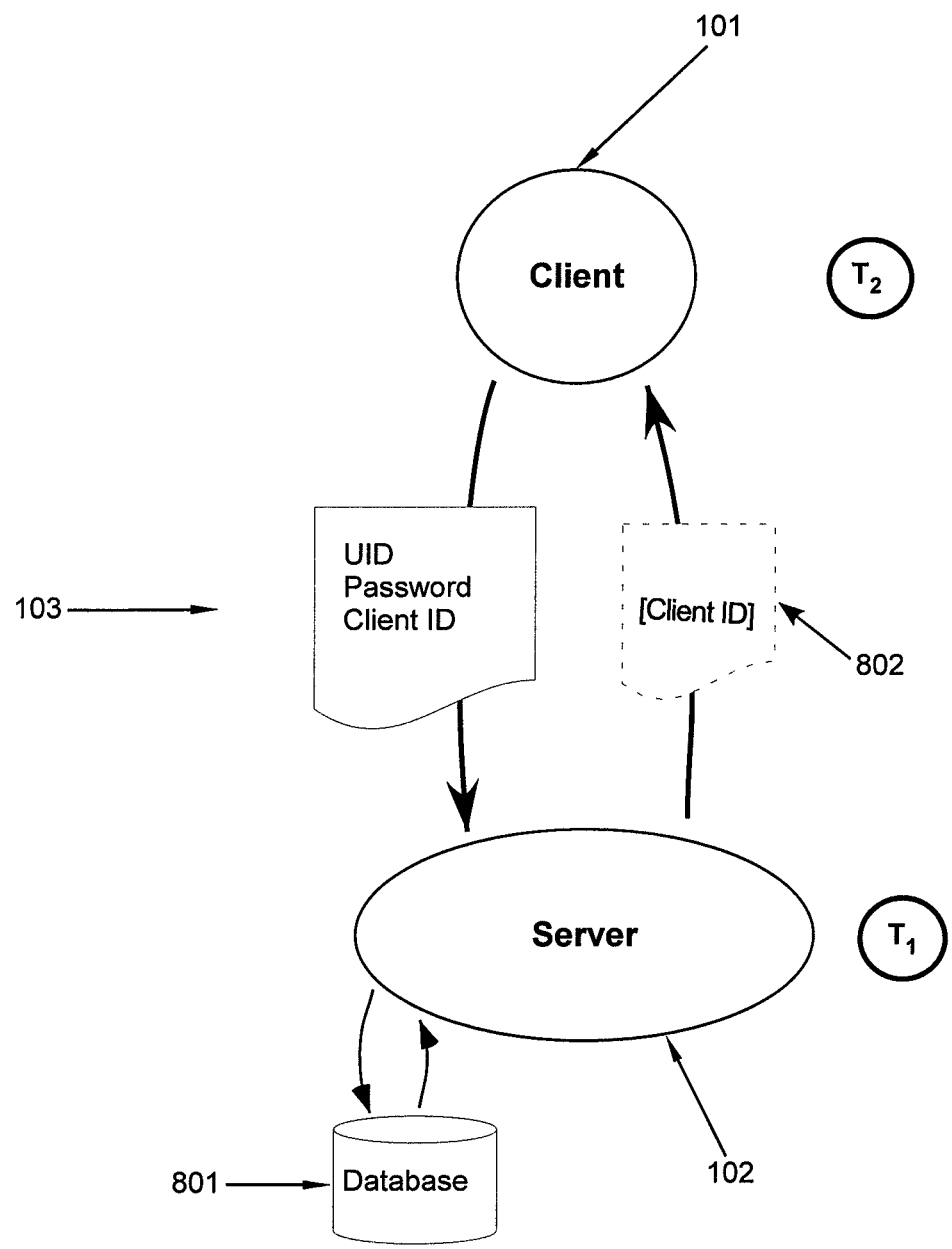
FIG. 8 provides a schematic diagram of a process of establishing a client as trusted, wherein an issued trust token is stored in a server-side database according to the invention.

FIG. 8 illustrates another embodiment of the invention, wherein the server stores the trust tokens in a server-side repository 801, such as a database, instead of sending them down to the client for storage on the client. In this case the server indexes stored tokens by the associated entity ID, preferably the user ID+client ID. Further, the client ID may be client-specific data originated by the client, e.g. the MAC address of the client computer, or may be a unique client ID 802 assigned by the server and sent down to the client for storage and return to the server on subsequent authentication requests.

Anonymous Client

In the case of logins from clients that provide no uniquely or semi-uniquely identifying client data, and which are not capable of storing and replaying server-generated trust tokens, the following IP-based trust scheme is provided:

Following each successful authentication, the network service adds or updates a database record containing the following information:
  user ID;
  client IP address;
  timestamp of first successful login by user from this client IP address; and
  timestamp of last successful login by user from this client IP address.

A record is added if it's the first time user has successfully authenticated from the client IP address. Otherwise, the record having matching user ID and client IP address is updated.

Each new authentication request contains the user ID and the client IP address. The network service extends trust to a new request according to one of the following alternate schemes:
  Exact client IP match. If the user ID and client IP address of the request match exactly those of an existing database record, and if the timestamps from the database record pass the configurable timestamp bounds checks, the request is trusted; otherwise, it is not.
  Trusted IP address range match:
    Step 1: determine trusted IP addresses ranges for the user ID. Network service computes one or more trusted IP address ranges for the user ID from the set of successful authentication records stored for that user ID.
    Step 2: check client IP address. If the client IP address of the current request is in one of the trusted IP ranges, the request is trusted, subject to step 3, otherwise it is not.
    Step 3: check timestamps. Compute the earliest authentication timestamp for the matching trusted IP address range as the minimum of the earliest authentication timestamps of the matching records, and likewise for the latest authentication timestamp. If the timestamps pass the configurable timestamp bounds checks, the request is trusted, otherwise, it is not.

The process flow for establishing an anonymous client as trusted is analogous to that shown in FIG. 7. Instead of attempting to obtain a trust token for the entity attempting to authenticate, the trust assessor 601 checks the database for a record of a previous successful authentication from the entity. The remaining steps proceed as previously described; however the role of the trust grantor 604 is creation or updating of a database record, rather than issuance of a trust token.

Figure 9:
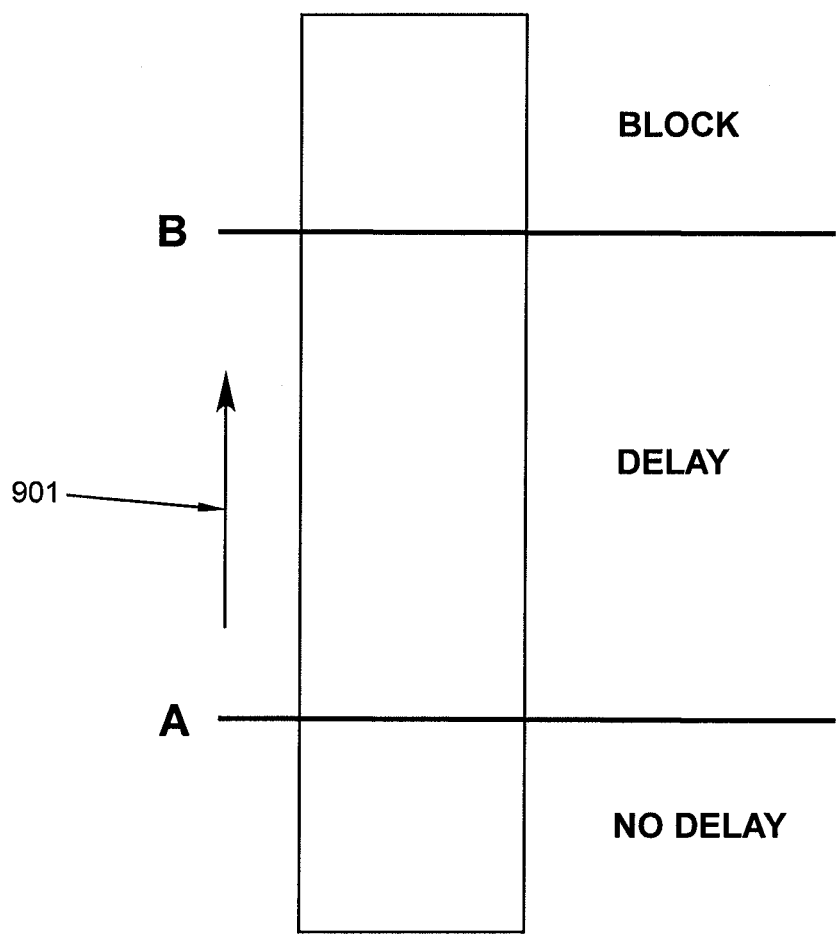
FIG. 9 depicts an enhanced rate limiting approach that may be applied to untrusted requests.

FIG. 9 depicts an enhanced rate limiting approach that may be applied to untrusted requests. The arrow 901 is included to indicate an increasing volume of network requests.

Below a configurable login threshold 'A,' no latency is applied. Traffic below the first threshold is assumed to be trusted, based on the low request rate per unit of time. The assumption tends to be valid because user ID/client pairs legitimately entitled to request service would successfully be able to login on the first attempt. Thus, the traffic volume tends to be low.

Above a second configurable threshold 'B,' traffic is dropped altogether, on the assumption that the traffic is hostile. The assumption tends to be valid because the rate specified by threshold 'B' is one achievable only by automatically generated network traffic, such as would result during an attack by a cracker or during a denial of service attack.

Above threshold 'A' and below threshold 'B,' latency is applied to untrusted login requests. Network traffic within this range is not of a high-enough volume to justify the extreme measure of completely blocking it, but is high enough to justify in increased index of suspicion. As previously described, imposing login latency frustrates a cracker's efforts sufficiently to give them a strong incentive to seek out weaker targets.

Identifiable Client

While the previous embodiments of the invention are applicable to the majority of clients, a third embodiment shown in FIG. 8, is applicable to clients that are not token-capable, but that do provide uniquely or semi-uniquely identifying data about the client making the login request. Examples of uniquely identifying data include:
  Disk drive serial number;
  MAC address.

Figure 10:
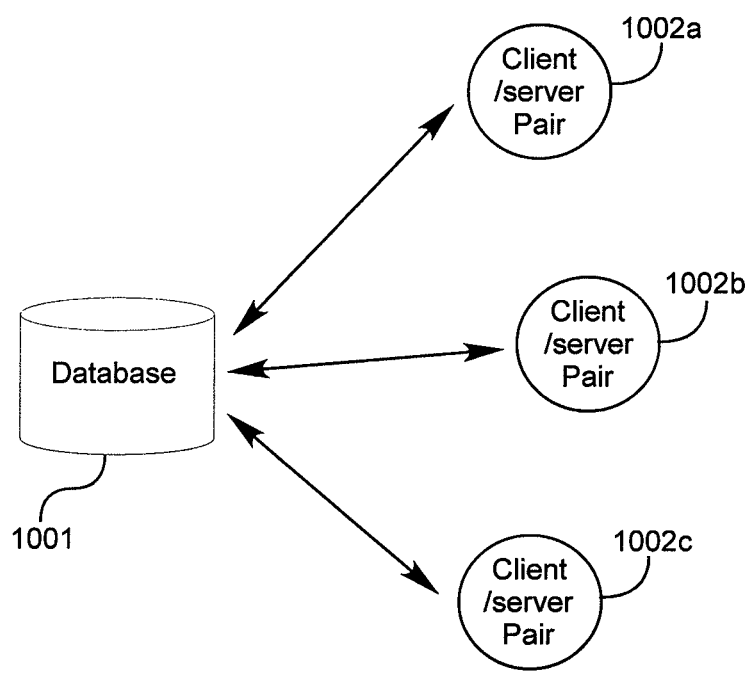
FIG. 10 provides a schematic diagram of a centralized system for trust-based fine-grained rate limiting of network requests according to the invention.

In the case of semi-uniquely identifying data, different items of data can be concatenated to form an identifier. For example, the client build number, the PC RAM (random access memory) and the phone number dialed are concatenated to produce a unique or semi-unique identifier. As shown, the client 101 directs a login request 103 to the network device 102. As previously described, the network device issues a trust token. However, as indicated by the arrow 802, the trust token is stored in a server side database. In this case, the login server uses the user id plus client data as a key into a database 601 of trust tokens stored server-side, instead of the token being stored on the client. During subsequent logins, as indicated by the arrow 803, the trust token is retrieved from the database 601 and evaluated. Following validation, the trust token is updated as previously indicated, and access is granted to the client 101. As shown in FIG. 10, an embodiment of the invention is possible in which a single centralized database 1001 serves a number of network devices, denoted here by servers 1002a-1002c.

While the incremental latency penalty is the currently preferred embodiment of the invention due to its ease of implementation and its user-friendliness, it should also be appreciated that it is possible to impose other penalties upon an untrusted login attempt. One such penalty is a requirement that the client successfully complete a Turing test. A Turing test typically constitutes a question or a task that can be readily solved by a live human, but that could be solved only imperfectly, if at all, by a machine. Thus, by requiring successful completion of a Turing test prior to login, one is readily able to distinguish a human user that is more likely to be entitled access to the server from a cracker launching an attack using cracking software. For example, a Turing test might be to correctly recognize characters embedded in an image containing distorted text characters to obtain permission to attempt a login.

Enhancements and Extensions

Figure 11:
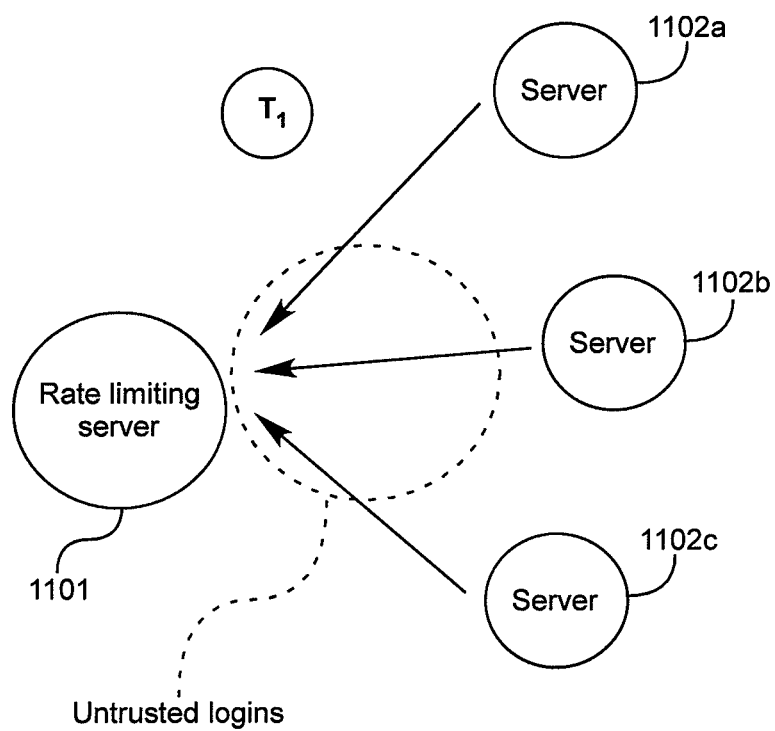
FIG. 11 provides a schematic diagram of a system trust-based fine-grained rate limiting of network requests wherein untrusted logins are routed to a central rate limiting server according to the invention.

FIG. 11 shows an alternate embodiment of the invention in which all business logic and code involved with processing untrusted logins is centralized to a rate limiting server 1101. Thus, the servers 1102a-1102c handle trusted logins, and all untrusted logins are directed to the central server 1101.

It will be appreciated that transmission of sensitive data such as authentication credentials most appropriately occurs over a secure network connection. Thus, all embodiments of the invention rely on protocol that ensures security and privacy in network communications. The invention preferably employs the SSL (secure sockets layer) protocol.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. A method comprising:
receiving one or more first data requests from a plurality of client devices;
upon successful authentication of one or more client devices of the plurality of client devices, establishing the one or more client devices as trusted by issuing one or more trust tokens to the one or more client devices, wherein issuing one or more trust tokens comprises generating, for a successful authentication, a trust token that encodes a user identifier and an IP address agnostic client device identifier;
receiving a second data request from client device of the plurality of client devices established as trusted;
if the second data request includes a valid trust token having an IP address agnostic client device identifier matching a client device identifier of the client device from which the second data request was sent, processing, using at least one processor, the second data request with a first response latency; and
if the second data request does not include a valid trust token having an IP address agnostic client device identifier matching a client device identifier of the client device from which the second data request was sent, processing, using the at least one processor, the second data request with a second response latency by introducing a delay in providing data corresponding to the second data request.

2. The method as recited in claim 1, wherein processing the second data request with the first response latency comprises processing with an added delay.

3. The method as recited in claim 1, further comprising determining if a trust token included in the second data request is valid by determining if the client device from which the second data request was sent is associated with a user identification received as part of the second data request.

4. The method as recited in claim 3, wherein determining if the client device from which the second data request was sent is associated with the user identification received as part of the second data request comprises determining if a first client identification of the client device matches a second client identification stored in the trust token.

5. The method as recited in claim 1, wherein issuing one or more trust tokens comprises issuing user-specific and client device specific trust tokens.

6. The method as recited in claim 5, wherein the user-specific and client device specific trust tokens comprises a user identification and a client identification.

7. The method as recited in claim 1, further comprising:
detecting that data requests lacking valid trust tokens exceed a first threshold; and
processing the second data request with a third response latency, the third response latency being longer that the second response latency.

8. The method as recited in claim 7, further comprising:
detecting that data requests lacking valid trust tokens exceed a second threshold; and
blocking the second data request.

9. A system comprising:
at least one processor; and
a non-transitory computer-readable storage medium comprising instructions that when executed by the at least one processor, cause the system to:
receive one or more first data requests from a plurality of client devices;
upon successful authentication of one or more client devices of the plurality of client devices, establish the one or more client devices as trusted by issuing one or more trust tokens to the one or more client devices, wherein issuing one or more trust tokens comprises generating, for a successful authentication, a trust token that encodes a user identifier and an IP address agnostic client device identifier;
receive a second data request from a client device of the plurality of client devices established as trusted;
if the second data request includes a valid trust token having an IP address agnostic client device identifier matching a client device identifier of the client device from which the second data request was sent, process the second data request with a first response latency; and
if the second data request does not include a valid trust token having an IP address agnostic client device identifier matching a client device identifier of the client device from which the second data request was sent, process the second data request with a second response latency by introducing a delay in providing data corresponding to the second data request.

10. The system as recited in claim 9, wherein the instructions when executed by the at least one processor further cause the system to determine if a trust token included in the second data request is valid by determining if the client device from which the second data request was sent is associated with a user identification received as part of the second data request.

11. The system as recited in claim 10, wherein the instructions when executed by the at least one processor further cause the system to determine if the client device from which the second data request was sent is associated with the user identification received as part of the second data request by determining if a first client identification of the client device matches a second client identification stored in the trust token.

12. The system as recited in claim 10, wherein the instructions when executed by the at least one processor further cause the system to determine if the client device from which the second data request was sent is associated with the user identification received as part of the second data request by querying a database to determine if a client identification of the client device is associated with the user identification.

13. The system as recited in claim 9, wherein the instructions when executed by the at least one processor further cause the system to issue user-specific and client device specific trust tokens that comprise a specific user identification and a specific client identification combination.

14. A non-transitory computer readable medium storing instructions that, when executed by at least one processor, cause a computing device to
establish one or more client devices as trusted by issuing one or more trust tokens to the one or more client devices, wherein issuing one or more trust tokens comprises generating, for a successful authentication, a trust token that encodes a user identifier and an IP address agnostic client device identifier;
receive a first data request for access to a communications system from a client device of the one or more client devices;
determine that the first data request includes a first valid trust token having an IP address agnostic client device identifier matching a client device identifier of the client device from which the first data request was sent and processing the first data request without added response latency in providing data corresponding to the first data request;
receive a second data request for access to the communications system from client device of the one or more client devices; and
determine that the second data request lacks a second valid trust token having an IP address agnostic client device identifier matching a client device identifier of the client device from which the second data request was sent and processing the second data request with added response latency in providing data corresponding to the second data request.

15. The non-transitory computer readable medium as recited in claim 14, wherein the instructions, when executed by the at least one processor, further cause the computing device to determine that the first data request includes a first valid trust token having an IP address agnostic client device identifier matching a client device identifier of the client device from which the first data request was sent by determining that the client device identifier of the client device from which the first data request was sent matches the IP address agnostic client device identifier in the first trust token included in the first data request.

16. The non-transitory computer readable medium as recited in claim 15, wherein the instructions, when executed by the at least one processor, further cause the computing device to determine that the second data request lacks a second valid trust token having an IP address agnostic client device identifier matching a client device identifier of the client device from which the second data request was sent by determining that the client device identifier of the client device from which the second data request was sent does not match the IP address agnostic client device identifier in the second trust token included in the second data request.

17. The non-transitory computer readable medium as recited in claim 15, wherein the instructions, when executed by the at least one processor, further cause the computing device to:
receive an initial request to access the communications system from the first client device, the initial request including a first user ID and a first password;
verify that the first user ID and the first password are valid; and
issue a first trust token to the first client device, the first trust token being valid for the first user ID and the first client device.

18. The non-transitory computer readable medium as recited in claim 14, wherein the instructions, when executed by the at least one processor, cause the computing device to process the second data request with added response latency by adding a configurable amount of delay in providing data corresponding to the second data request.

19. The method as recited in claim 1, wherein the second response latency is longer than the first response latency.

20. The method as recited in claim 1, further comprising determining that the second data request includes a valid trust token by verifying that a timestamp of a trust token associated with the second data request is no earlier than a minimum timestamp associated with a server that issued the one or more trust tokens.

* * * * *